March 8, 1966 B. E. LONG ETAL 3,239,703
ARMATURE APPARATUS FOR MOTORS AND METHOD FOR MAKING THE SAME
Filed March 18, 1963 4 Sheets-Sheet 1
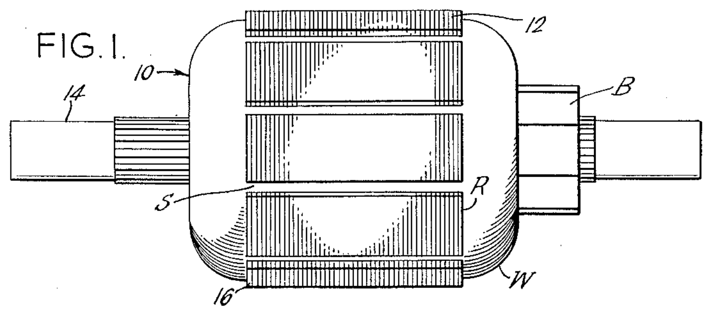
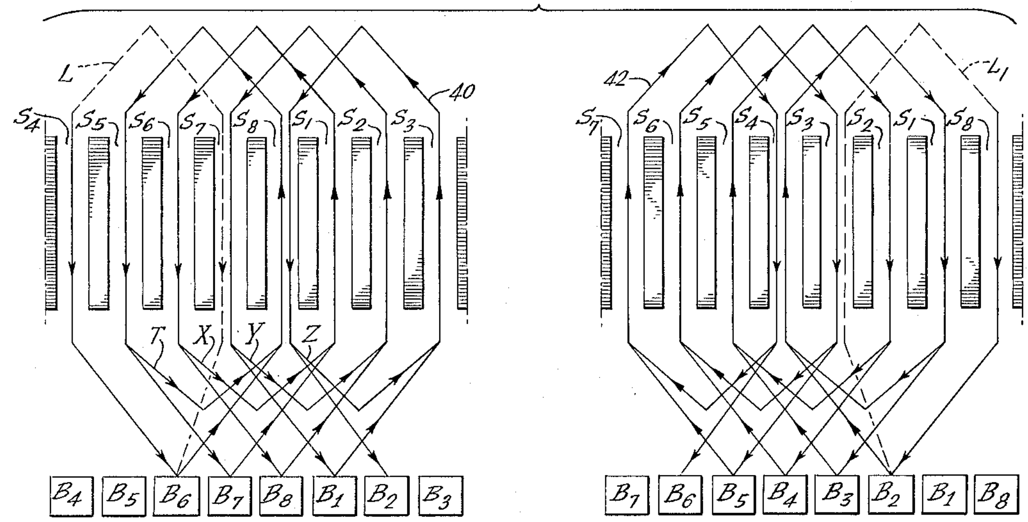
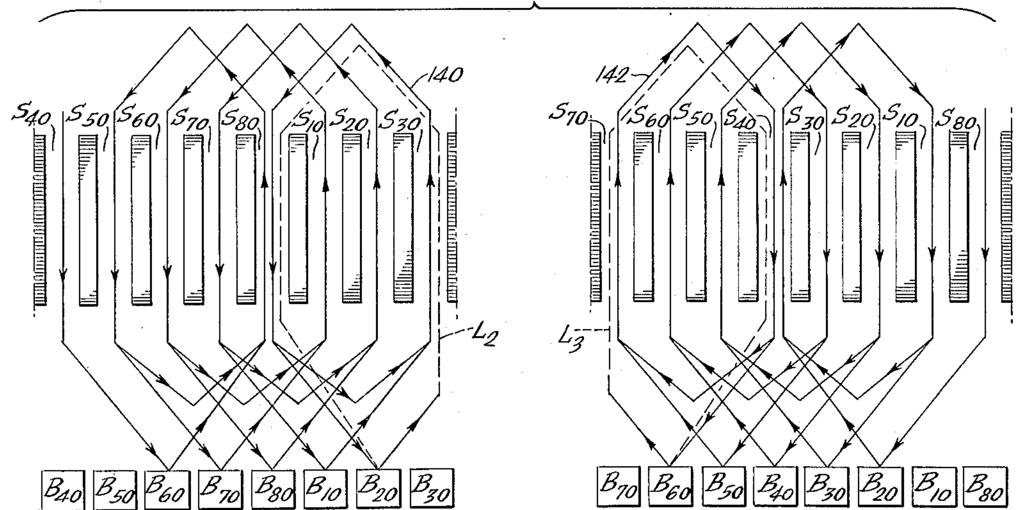
INVENTORS:
BENJAMIN E. LONG
DONALD W. OWENS
BY *Howson & Howson*
ATTYS.

March 8, 1966 B. E. LONG ETAL 3,239,703

ARMATURE APPARATUS FOR MOTORS AND METHOD FOR MAKING THE SAME

Filed March 18, 1963 4 Sheets-Sheet 2

INVENTORS:
BENJAMIN E. LONG
DONALD W. OWENS

BY Howson & Howson
ATTYS.

ARMATURE APPARATUS FOR MOTORS AND METHOD FOR MAKING THE SAME

Filed March 18, 1963 4 Sheets-Sheet 3

INVENTORS:
BENJAMIN E. LONG
DONALD W. OWENS
BY Howson & Howson
ATTYS.

ARMATURE APPARATUS FOR MOTORS AND METHOD FOR MAKING THE SAME

Filed March 18, 1963

INVENTORS:
BENJAMIN E. LONG
DONALD W. OWENS

BY Howson & Howson
ATTYS.

United States Patent Office 3,239,703
Patented Mar. 8, 1966

1

3,239,703
ARMATURE APPARATUS FOR MOTORS AND METHOD FOR MAKING THE SAME

Benjamin E. Long and Donald W. Owens, Columbus, Miss., assignors to American Bosch Arma Corporation, Columbus, Miss., a corporation of New York Filed Mar. 18, 1963, Ser. No. 265,797
12 Claims. (Cl. 310—183)

This invention relates to armatures for electric motor apparatus, such as direct current, series wound electric motor apparatus. More particularly the present invention relates to new and improved armature means for controlling the speed characteristics in such apparatus in a manner to prevent "overspeeding" or "runaway" conditions when the motor is under comparatively light load or no load and to a method of making such improved armature means.

A well-known characteristic of direct current, series wound electric motors is that they possess a high stall or starting torque as compared, for example, to shunt or compound wound motors and accordingly they are often employed for example, in window lift and seat mover installations for automobiles or the like where the load on the motor may vary from a comparatively heavy starting load to a substantially no-load condition. A drawback of the series wound motor in these applications is that it tends to "overspeed" or "runaway" when the load is comparatively small. When running at excessively high speeds, the series motor tends to be noisy and in some instances there is the possibility of damage to the armature windings.

Various attempts have been made in the past to solve this problem of "runaway" in direct current, series wound motors but these proposals have not been entirely satisfactory. For example, one proposed solution to the problem consists in the use of a mechanical means such as a spring or bowed washer engaging the armature shaft providing a mechanical or friction load thereon. However, since the load imposed by the washer is present regardless of armature speed, it has the disadvantage of loading the armature at times when it is not needed and even not wanted, for example, during initial starting of the motor when high stall or starting torque is desired. In accordance with other attempts to solve the problem it has been proposed to provide separate short circuited armature windings. However, such armature assemblies of the prior art are comparatively expensive to manufacture and in some instances cut down on the overall performance of the motor and/or cause an unbalanced condition contributing to undue wear on the motor. In still other instances it has been proposed to wedge bars or strips of conducting material forcibly into each of the slots of the armature between the outer tips of the teeth of the rotor assembly of the armature and the armature windings. This assembly is also relatively expensive to manufacture.

The present invention provides a new and improved economical means of preventing "runaway" in electric motor apparatus. To this end, the armature is provided with a least one short circuited loop of wire surrounding the rotor assembly of the armature and formed integrally as an extension of the armature windings. By this arrangement, as the armature rotates in a magnetic field set up by the motor field windings, a current is induced in the short circuited loop setting up a magnetic field which opposes the magnetic field normally causing the armature to rotate.

The induced current flow increases proportionately with increased armature speeds and is of a sufficient magnitude at high armature speeds to prevent "runaway."

2

Accordingly, an effective speed control of the armature is provided by the induced magnetic field, the maximum control occurring at the higher speeds of the armature where the danger of "runaway" or "overspeeding" exists. Further the opposing magnetic field is minimal at the lower armature speeds thereby to preserve the high stall or starting torque characteristics of the motor.

In accordance with the present method for assembling the armature, the armature windings are wound onto the core structure by first securing the wire to one of the commutator bars, then applying a predetermined number of turns of the wire on the rotor assembly and thereafter successively attaching the wire to another of the commutator bars and winding additional turns on the armature until winding of the armature has been completed. Thereafter at least one of the terminal ends of the wire is wrapped around the rotor assembly and attached to one of said commutator bars to which it had previously been attached to provide at least one short circuited loop around the armature. Accordingly the armature may be wound in a single operation by conventional apparatus to provide a highly economical method for winding the armature.

With the foregoing in mind, it is an object of the present invention to provide a new and improved rotor assembly for an armature which effectively eliminates the danger of "runaway" or "overspeeding" and yet preserves the desired high starting torque characteristic thereby eliminating objectionable noises and damage to the motor under little or no-load conditions.

A further object of the present invention is to provide a motor apparatus incorporating speed control means in accordance with the present invention which is of comparatively simplified construction whereby the apparatus may be assembled easily and manufactured economically and which is very effective for the purposes intended.

Another object of the present invention is to provide an improved method for fabricating in an economical manner an armature incorporating speed control means of the present invention.

These and other objects of the present invention and the various features and details of the construction and operation thereof are more fully set forth hereinafter with reference to the accompanying drawings, wherein:

FIG. 1 is a side elevational view of an armature constructed in accordance with the present invention;

FIG. 2 is a schematic illustration of one winding arrangement of an armature in accordance with the present invention;

FIG. 3 is a schematic view similar to FIG. 2 showing another form of winding arrangement for an armature in accordance with the present invention;

Figure 5:
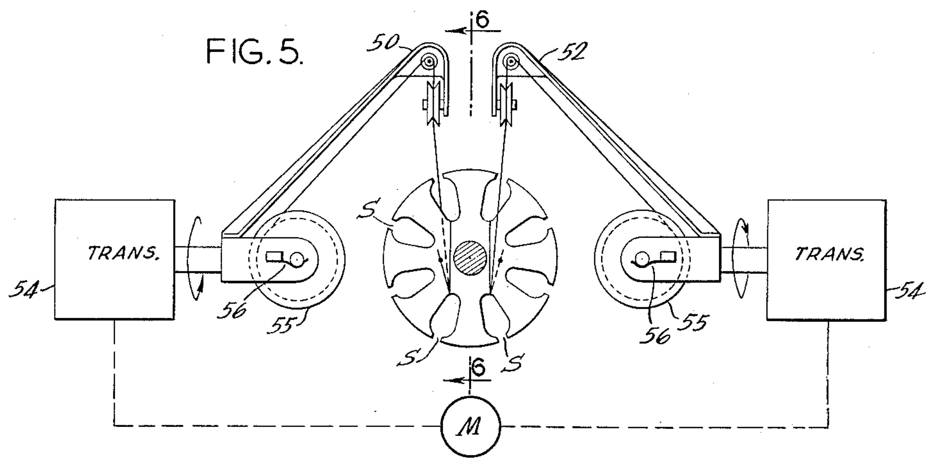
FIGS. 5 and 6 illustrate winding apparatus for winding an armature in accordance with the present invention.

Referring now to the drawings, there is shown in FIG. 1 an armature 10 for a motor apparatus, such as a series wound, direct current motor which embodies speed control means in accordance with the present invention. The armature comprises a rotor assembly 12 mounted on a shaft 14. The rotor assembly 12 consists of a laminated core structure comprised of a plurality of thin laminations or plates 16, each of which has a plurality of radially extending, circumferentially spaced T-shaped teeth 18 as best shown in FIG. 5. The teeth 18 of the laminations of the core structure are aligned in rows R to provide a plurality of axially extending slots S between the rows R to receive the armature windings W. The armature windings are connected to a plurality of circumferentially extending mutually-insulating commutator bars B mounted on the shaft 14 at one end of the core structure.

It has been found that when the armature 10 rotates in a magnetic field in a motor assembly, a voltage is induced in the laminations 16 of the rotor assembly which results in a current flow within each lamination 16 and from lamination to lamination. This induced current flow produces a magnetic field opposing the normal magnetic field of the armature windings W which causes the armature to rotate, thus tending to slow the motor. The amount of induced current flow in the laminations 16 of the rotor assembly is directly proportional to the speed at which the armature 10 rotates and hence the slowing action tends to become higher at the higher armature speeds. However, even though the laminations are mounted in close face-to-face relation, there is a comparatively poor electrical contact between the laminations, due for example, to small particles therebetween and surface irregularities between confronting surfaces of adjacent laminations. Accordingly the magnetic field produced by the induced current flow in the laminations 16 is comparatively weak and does not appreciably affect the normal magnetic field of the armature windings W and actually does not slow down the motor. Thus, under small or no-load conditions, the motor has a tendency to "overspeed" or "runaway."

In accordance with the present invention, means is provided for inducing a flow of current in the rotor assembly providing a magnetic field opposing the normal magnetic field of the armature windings, which not only increases proportionately with increased armature speeds, but is of a sufficient magnitude at high armature speeds to prevent "runaway." Accordingly, an effective speed control of the armature is provided by the induced magnetic field, a maximum control occurring at higher speeds of the armature where the danger of "runaway" or "overspeeding" exists. The magnetic field of the induced current is minimal at the lower speeds of the armature to preserve the high stall or starting torque characteristics of the motor. To this end, an elongated filamentary current conducting member in the form of a wire made of a material having a high electrical conductivity is wound about the core structure of the rotor assembly in a manner to provide the armature windings W and to provide at least one short circuited loop L. In the present instance, the short circuited loop L is an integral extension of the armature windings W.

FIG. 2 is a schematic development of one embodiment of wiring pattern for an armature in accordance with the present invention. In accordance with the winding arrangement shown in FIG. 2, the armature windings W are formed by two separate wires 40 and 42 wound onto the rotor structure in the pattern shown to provide two short circuited loops L and $L_1$ at the lead end of each of the wires 40 and 42. The developed pattern shown schematically merely indicates the direction of winding of the wires 40 and 42 and does not show all of the turns in each of the slots of the armature, the left hand side of FIG. 2 being a developed pattern for the wire 40 and the right hand side being a developed pattern for the wire 42. Considering now more specifically the winding arrangement of FIG. 2, the wire 40 is initially secured to one of the commutator bars $B_6$ at a point spaced from its free lead end to provide a predetermined length of wire at the free lead end of the wire and the wire 42 is secured to the commutator bar $B_2$ in a similar manner. The wires 40 and 42 are connected to the commutator bars B by soldering, crimping, fuse welding or any other suitable means. Thereafter the wires 40 and 42 are wound onto the armature in the pattern shown and secured to the commutator bars $B_1$–$B_8$ in the manner shown to provide a given number of turns of wire in each of the slots $S_1$–$S_8$, inclusive. Thereafter the lead end of the wires 40 and 42 are looped around the armature and secured to the commutators $B_6$ and $B_2$ respectively to which they were initially secured to provide the short circuited loops L and $L_1$. This winding arrangement provides continuous short circuited turns or electrically closed loops L and $L_1$ around the core structure of the armature.

Accordingly, a plurality of low-resistance paths are formed to effect a high induced current flow during rotation of the armature to provide a magnetic field of sufficient magnitude to prevent "overspeeding." The effect of the induced magnetic field is of a sufficient magnitude to prevent "runaway" or "overspeeding" at higher armature speeds and is minimal at the lower armature speeds to preserve the desired high stall or starting torque characteristics of the motor. It is noted that by providing the short circuited loops integral with the armature windings, the armature may be wound on a conventional apparatus in a highly economical manner to provide a very economical structure.

It is noted that the left and right hand sides of FIG. 2 as well as FIGS. 3, 4 and 7–12 inclusive are schematic drawings illustrating winding patterns and do not show the left and right hand sides of the armature winding. Each of the illustrations shown in the drawings is in the nature of a development of the armature slot arrangement such as might be obtained by longitudinally slitting the armature and flattening it out. The developments on the left and right hand sides of each figure are shown from somewhat different angular positions of the rotor merely as a convenience in representation in view of the different starting points for the two windings shown in each figure. Further it is noted that the slots and bars are in the same sequence going circularly around the rotor, the only difference between the left hand and right hand sides of the figures in this respect being that in one case the winding is viewed from one side of the development and in the other case from the opposite side of the development.

The winding pattern illustrated schematically in FIG. 3 is similar to that shown in FIG. 2 except that the wires 140 and 142 are completely wound onto the armature in the pattern shown and the short circuited loops $L_2$ and $L_3$ are provided by connecting the finish ends of the wires 140 and 142 respectively to the last commutator bar $B_{20}$ and $B_{60}$ to which the wires are secured in the winding operation.

Figure 4:
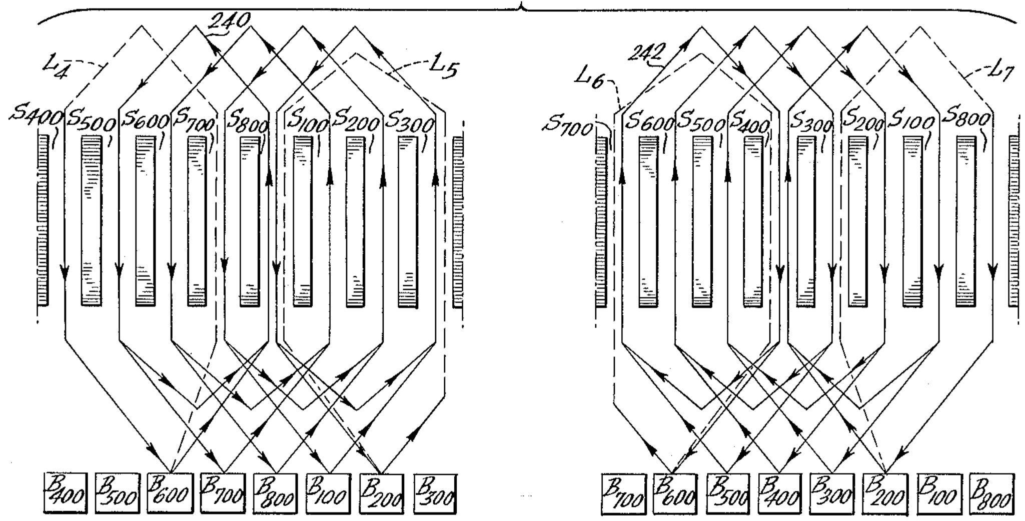
FIG. 4 is another schematic view of still another winding arrangement for an armature in accordance with the present invention.

The winding pattern shown schematically in FIG. 4 is a combination of the patterns shown in FIGS. 2 and 3 wherein short circuited loops $L_4$ and $L_5$ are provided respectively by connecting the lead end of the wire 240 across the commutator bar $B_{600}$ and the finish end across the bar $B_{200}$. Short circuited loops $L_6$ and $L_7$ are provided respectively by connecting the lead end of the wire 242 across the commutator bar $B_{600}$ and the finish end across the bar $B_{200}$.

In accordance with the present method of assembling the armature, the laminations 16 are pressed into the shaft 14 with the teeth 18 aligned in rows to define the axial slots S between the rows R. The commutator bars $B_1$–$B_8$ are then mounted on the shaft at one end of the core structure. Thereafter the core structure is supported in a conventional winding apparatus of the type shown schematically in FIGS. 5 and 6 for application of the armature windings.

Figure 6:
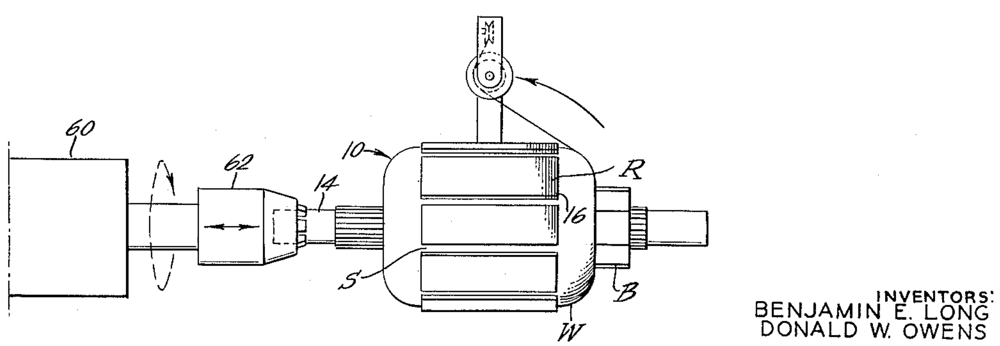

The winding apparatus comprises a chuck 62 wherein one end of the shaft 14 is held as illustrated in FIG. 6 and indexing means 60 for moving the rotor assembly axially to position it in place for receiving the windings and also to rotate the core structure in predetermined angular increments. The winding apparatus further includes a pair of flyers 50 and 52 mounted for movement in a rotary path by transmission means 54 operated from a common motor source M. Each of the flyers mounts a wire supply spool 55 and a tensioning clamp 56 to create a drag on the wire as it is drawn from its supply spool.

With regard to the wire 40, it is initially laid in the slot $S_4$ and secured to the commutator bar $B_6$ at a point spaced from its lead end to provide a predetermined length of wire at the free end thereof. The wire 40 is then passed through slot $S_8$ and back through slot $S_5$ by the flyer 50. The flyer then passes the wire between these slots as indicated at T to provide a predetermined number of turns between the slots $S_8$ and $S_5$. The number of turns between the slots is dependent upon the overall desired performance of the motor. The core structure is then indexed by the indexing means 60 to a new position and thereafter the wire 40 is connected to the commutator bar $B_7$ and is then guided through the slot $S_1$ and back through the slot $S_6$. The flyer 50 then applies a predetermined number of turns of wire as indicated at X between slots $S_1$ and $S_6$. After these turns are applied, the core structure is indexed and the wire is then connected to the commutator bar $B_8$, passed up through the slot $S_2$ and down through the slot $S_7$ by the flyer 50. The wire 40 is wound between these slots as indicated at Y to apply a predetermined number of turns. The core structure is again indexed and the wire is then connected to the commutator bar $B_1$, passed up through slot $S_3$ and down through the slot $S_8$. The flyer 50 then applies a predetermined number of turns of wire between these slots as indicated at Z after which the finish end of the wire is connected to the commutator bar $B_2$. In the present instance the right hand flyer 52 is simultaneously winding the wire 42 in the manner shown schematically in FIG. 2.

The armature winding provided by winding in accordance with the pattern shown schematically in FIG. 3 is produced by much the same winding procedure as that described above except that in accordance with the pattern of FIG. 3, the finish ends of the wires 140 and 142 are connected to the commutator bars $B_{20}$ and $B_{60}$ respectively at a point spaced from their free terminal ends to leave a short length of wire which is then looped around the armature and again connected to the bars $B_{20}$ and $B_{60}$ to provide the short circuited loops $L_2$ and $L_3$.

The pattern shown schematically in FIG. 4 is a combination of the patterns of FIGS. 2 and 3. Thus, the lead end and the finish end of the wire 240 are connected to the bars $B_{600}$ and $B_{200}$ to leave short lengths of wire which are looped around the armature and again connected to the bars $B_{600}$ and $B_{200}$ to provide the short circuited loops $L_4$ and $L_5$. The wire 242 is similarly wound to provide the short circuited loops $L_6$ and $L_7$.

The induced current flow slowing down the armature at higher speeds provided by the short circuited turns or loops may also be employed advantageously in applications where a motor apparatus is required to provide dynamic braking. The dynamic braking referred to is provided by the current generated within the motor apparatus as the armature turns in the absence of externally applied armature current, which tends to arrest turning of the armature. In the present instance, the current flow in the short circuited turns or loops tends to increase the rate of deceleration of the armature thus providing dynamic braking. In this regard it is of course to be understood that when used to effect dynamic braking, the short circuited wire arrangement may be used in motors other than direct current, series wound motors.

While particular embodiments of the present invention have been illustrated and described herein, it is not intended to limit the invention to such disclosure and changes and modifications may be made therein within the scope of the following claims. For example in the illustrated embodiments the short circuited loop is composed of one turn. However, it is to be understood that more than one loop can be provided at the lead or finish end of each of the wires. Further, if desired, only one of the wires of the armature may be wound to provide one or more short circuited loop. Additionally, the complete armature winding including one or more short circuited loops may be applied by a single flyer. Further the short circuited loops may be formed prior to winding and may be distributed in any manner desired so long as each loop is electrically connected to the same commutator bar.

FIGS. 7–12 inclusive illustrate other winding arrangements for an armature in accordance with the present invention showing some of the arrangements mentioned above. For example, in the winding pattern shown in FIG. 7, the lead end of the wire 340 is connected to the commutator bar $B'_6$ at a point spaced from its lead end to provide a sufficiently long length of wire to form a short circuited loop $L_8$ having at least two turns C around the core structure. The wire 342 is similarly arranged to provide a short circuited loop $L_9$ having at least two turns $C_1$ around the core structure. The winding procedure for producing this winding pattern is carried out on the apparatus as shown in FIGS. 5 and 6 by connecting the lead ends of the wires 340 and 342 to the commutator bars $B'_6$ and $B'_2$ respectively at points spaced from their free ends to leave predetermined lengths of wire at the free lead ends thereof. These lengths are then wrapped between the slots indicated to provide the loops $L_8$ and $L_9$ each composed of plural turns as at C and $C_1$.

Figure 8:
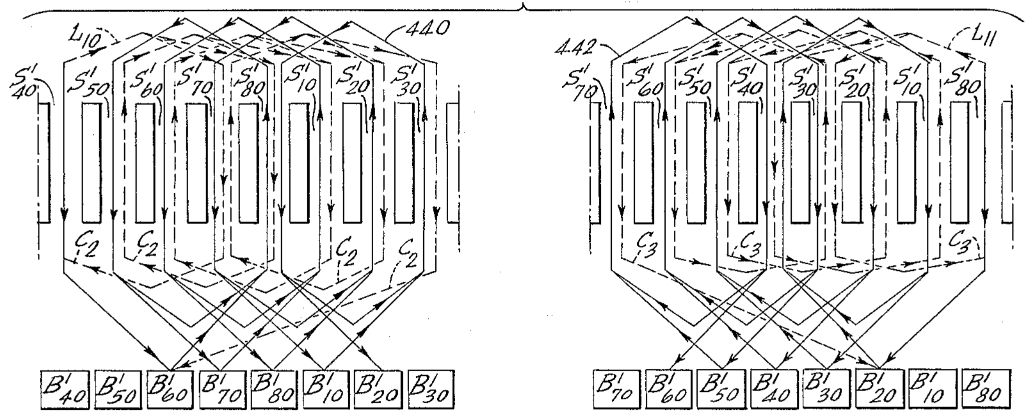

In the winding pattern illustrated schematically in FIG. 8, the short circuited loops $L_{10}$ and $L_{11}$ are provided by wrapping the free lead end of the wire around the core structure in the manner indicated, each of the loops comprised of a plurality of turns $C_2$ and $C_3$ which are arranged so that they lie in each of the slots of the core structure as illustrated. In winding this pattern, the lead end of each of the wires 440 and 442 is connected to the commutator bars $B'_{60}$ and $B'_{20}$ respectively at a point spaced relatively distant from the free end of the wire to provide a long length of wire which then can be looped around the armature and laid in all of the slots as shown to provide the short circuited loops $L_{10}$ and $L_{11}$ having the plural turns as at $C_2$ and $C_3$.

Figure 9:
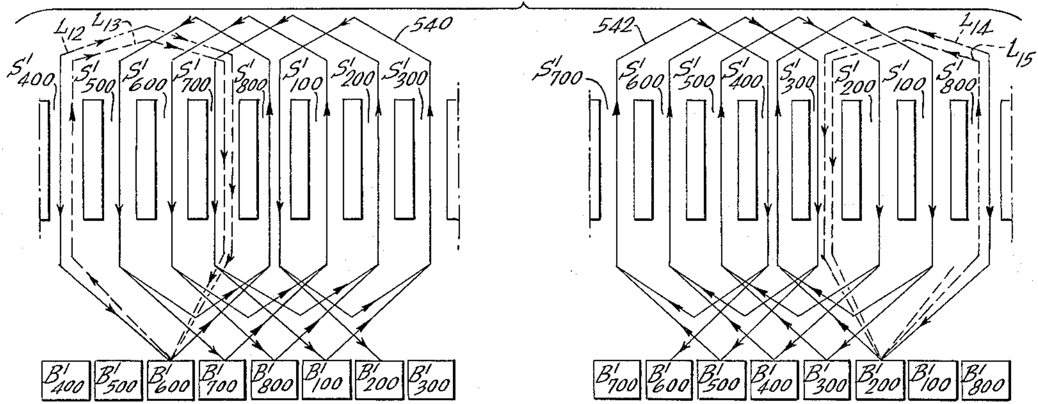

The winding pattern illustrated schematically in FIG. 9 comprises a pair of short circuited loops $L_{12}$, $L_{13}$ and $L_{14}$ and $L_{15}$ at the lead end of the wires 540 and 542 respectively. In winding the armature to produce the pattern shown in FIG. 9, the lead end of the wire 540 is connected to the commutator bar $B'_{600}$ at a point spaced from its free lead end to provide a short length of wire which is wrapped around the core structure in the slots indicated and connected to the commutator bar $B'_{600}$ at a point spaced from its free end to form the loop $L_{12}$, the remaining portion then being wrapped around the core structure again and the free lead end secured to the bar $B'_{600}$ to provide another short circuited loop $L_{13}$. The wire 542 is applied in a similar manner to form the short circuited loops $L_{14}$ and $L_{15}$ at the free end thereof.

Figure 7:
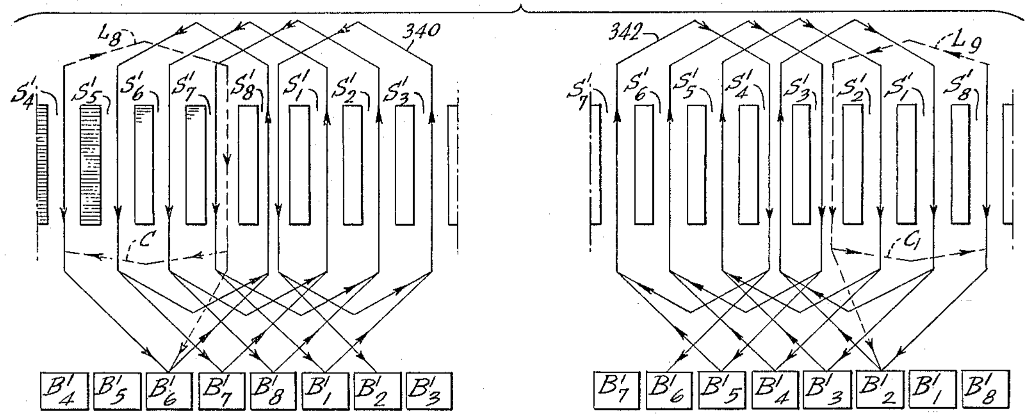
FIGS. 7–12 inclusive are schematic views similar to FIG. 2 showing various forms of winding arrangements for an armature in accordance with the present invention.
Figure 10:
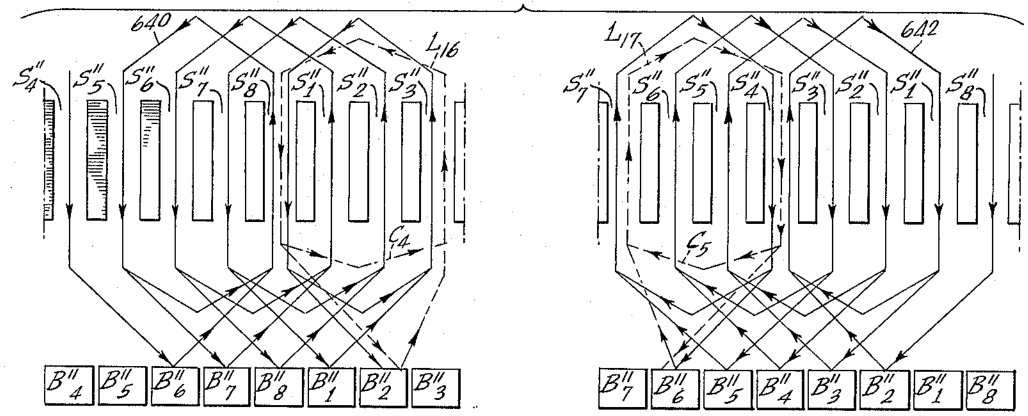

The winding pattern illustrated schematically in FIG. 10 is similar to that shown in FIG. 7 except that in the present instance, the short circuited loops $L_{16}$ and $L_{17}$ comprised of plural turns as at $C_4$ and $C_5$ respectively is provided at the finish ends of the wires 640 and 642. In accordance with this winding arrangement, the wires 640 and 642 are applied to the core structure and wound on the core structure to provide the armature winding. The finish end of the wire 640 is then connected to the commutator bar $B''_6$ at a point spaced from its free terminal end and the length of wire remaining is then wrapped twice around the core structure in the slots indicated, the extreme end of the wire then being connected again to the commutator bar $B''_6$ to form the loop $L_{16}$. The finish end of the wire 642 is then wrapped in the same manner to provide the short circuited loop $L_{17}$ with the plural turns.

Figure 11:
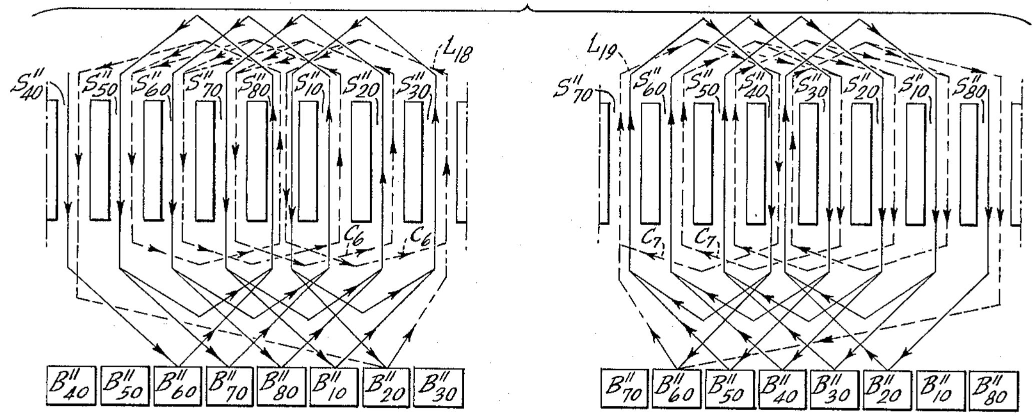

The winding pattern shown in FIG. 11 is the counterpart of that shown in FIG. 8 except that in the present instance the short circuited loops $L_{18}$ and $L_{19}$ having the plural turns $C_6$ and $C_7$ that pass through each of the slots of the armature are formed at the finish ends of the wires 740 and 742 respectively. In winding this pattern, after the armature winding is formed, the finish end of the wire 740 is connected to the commutator bar $B''_{60}$ at a point spaced considerably from its finish free end to provide a relatively long length of wire which is then wrapped around the core structure several times as indicated at C to pass at least once through each of the slots. The free end of the wire is then again connected to the bar $B''_{60}$ to provide the short circuited loop $L_{18}$ with the plural turns in each of the slots of the core structure. The wire 742 is applied in the same manner.

Figure 12:
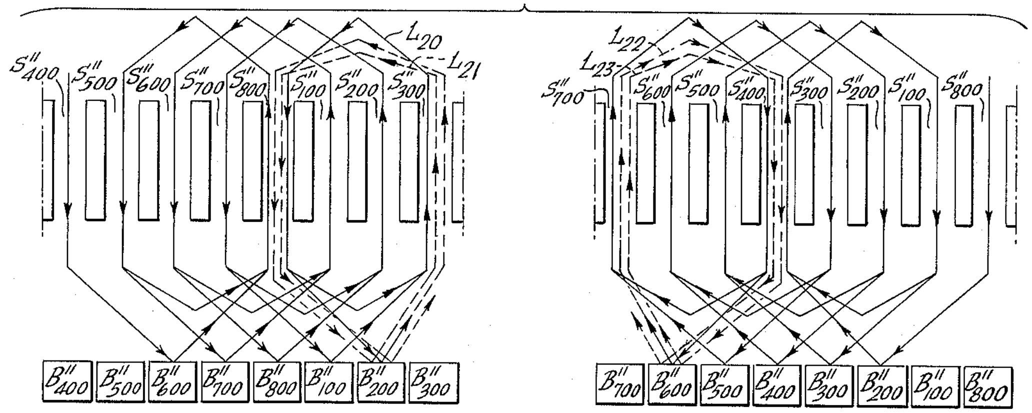

The winding pattern of FIG. 12 is a counterpart of FIG. 9 comprised of a pair of short circuited loops $L_{20}$, $L_{21}$ and $L_{22}$, $L_{23}$ at the finish end of the wires 740 and 742 respectively. This pattern is wound by connecting the finish end of the wire at a point spaced from its free terminal end to the commutator bar $B''_{200}$ wrapping it around the core structure between the slots $S''_{100}$ and $S''_{360}$, again connecting it to the bar $B''_{200}$, wrapping it around the core structure in the same slots and then finally again connecting it to the commutator bar $B''_{200}$ to form the pair of short circuited loops $L_{20}$, $L_{21}$. If more than a pair is desired a suitable length of wire is left at the finish end to form more than two loops. The wire 742 is then applied in the same manner to provide the pair of short circuited loops $L_{22}$, $L_{23}$.

We claim:

1. A rotor assembly for an armature comprising a core structure, at least one commutator bar at one end of said core structure, a continuous truly-balanced and short-circuiting armature winding on the core structure, said winding comprising an elongated filamentary element of electrically conductive material, a major portion of which is wound in a predetermined manner on said core structure to provide the truly balanced armature winding, and an end portion of which is connected at least at two spaced apart points along its length to said commutator bar to provide at least one electrically closed loop on said core structure for producing said short circuiting.

2. A rotor assembly for an armature comprising a core structure, at least one commutator bar at one end of said core structure, a continuous truly-balanced and short-circuiting armature winding on the core structure, said winding comprising an elongated filamentary element of electrically conductive material, a major portion of which is wound in a predetermined manner on said core structure to provide the truly balanced armature winding, means connecting an end portion of said filamentary element at least two spaced apart points along its length to said commutator bar, said points being spaced apart to provide a segment between said points of a length to surround the core structure thereby to form at least one electrically closed loop on said core structure for producing said short circuiting.

3. A rotor assembly for an armature comprising a core structure, at least one commutator bar at one end of said core structure, a continuous truly-balanced and short-circuiting armature winding on the core structure, said winding comprising an elongated filamentary element of electrically conductive material, a major portion of which is wound in a predetermined manner on said core structure to provide the truly balanced armature winding, and an end portion of which is connected at its free lead end and at a point spaced from its free end to said commutator bar to provide a segment between said free end and said point of a length sufficient to surround said core structure thereby to form at least one electrically closed loop on said core structure for producing said short circuiting.

4. A rotor assembly for an armature comprising a core structure, at least one commutator bar at one end of said core structure, a continuous truly-balanced and short-circuiting armature winding on the core structure, said winding comprising an elongated filamentary element of electrically conductive material, a major portion of which is wound in a predetermined manner on said core structure to provide the truly balanced armature winding, and an end portion of which is connected to said commutator bar at said finish end and at a point spaced from its finish end to provide a segment between said connecting points of a length to surround said core structure thereby to provide at least one electrically closed loop on said core structure for producing said short circuiting.

5. A rotor assembly for an armature comprising a core structure, a plurality of commutator bars at one end of said core structure, a continuous truly-balanced and short-circuiting armature winding on the core structure, said winding comprising first and second elongated filamentary elements of electrically conductive material, a major portion of each of said first and second filamentary elements being wound in a predetermined manner on the core structure to provide the truly balanced armature winding, an end portion of said first filamentary element being connected at least at two spaced apart points along its length to one of said commutator bars to provide a first electrically closed loop on said core structure for producing said short circuiting, an end portion of said second elongated filamentary element being connected at least at two spaced apart points along its length to another of said commutator bars to provide a second electrically closed loop on said core structure for producing said short circuiting.

6. A rotor assembly for an armature comprising a core structure including a plurality of laminations each having a plurality of spaced apart teeth, said laminations arranged in face-to-face relation with the teeth aligned in rows to define a plurality of slots between said rows extending transversely of the laminations, at least one commutator bar mounted at one end of the core structure, a continuous truly-balanced and short-circuiting armature winding on the core structure, said winding comprising an elongated filamentary element of electrically conductive material, a major portion of which is wound in a predetermined manner on said core structure to provide the truly balanced armature winding, and an end portion of which is connected at least at two spaced apart points along its length to said commutator bar to define a segment between said points surrounding said core structure to provide at least one electrically closed loop on said core structure for producing said short circuiting.

7. A rotor assembly for an armature comprising a core structure having a plurality of slots and at least one commutator bar mounted at one end of the core structure, a continuous truly-balanced and short-circuiting armature winding on the core structure, said winding comprising an elongated filamentary element of electrically conductive material, a major portion of which is wound in a predetermined manner on said core structure to provide the truly balanced armature winding, and an end portion of which is connected adjacent its free lead end and at least at one point spaced from its free lead end to said commutator bar to provide a segment of said element between said free end and said one point of a length sufficient to surround said core structure more than one turn to provide at least one electrically closed loop on said core structure comprised of a plurality of turns around the core structure for producing said short circuiting.

8. A rotor assembly as claimed in claim 7 wherein the plural turns engage in each of the slots of the core structure.

9. A rotor assembly as claimed in claim 7 wherein said filamentary element is connected to said commutator bar at an additional point between its free lead end and said one point thereby to form a pair of electrically closed short circuited loops on said core structure.

10. A rotor assembly for an armature comprising a core structure having a plurality of slots and at least one commutator bar mounted at one end of the core structure, a continuous truly-balanced and short-circuiting armature winding on the core structure, said winding comprising an elongated filamentary element of electrically conductive material, a major portion of which is wound in a predetermined manner on said core structure to provide a truly balanced armature winding, and an end portion of which is connected adjacent its free finish end and at least at one point spaced from its free finish end to said commutator bar to provide a segment of said element between said free finish end and said one point of a length sufficient to surround said core structure more than one turn to provide at least one electrically closed loop on said core structure comprised of a plurality of turns around the core structure for producing said short circuiting.

11. A rotor assembly as claimed in claim 10 wherein the plural turns engage in each of the slots of the core structure.

12. A rotor assembly as claimed in claim 10 wherein said filamentary element is connected to said commutator bar at an additional point between its free finish end and said one point thereby to form a pair of electrically close short circuited loops on said core structure.

References Cited by the Examiner

UNITED STATES PATENTS

| | | | |
|---|---|---|---|
| 1,371,233 | 3/1921 | Fries | 310—211 |
| 1,621,937 | 3/1927 | Lee | 310—183 |
| 1,743,818 | 1/1930 | Hansen et al. | 310—211 X |
| 1,872,371 | 8/1932 | Weichsel | 310—211 X |
| 2,384,489 | 9/1945 | Pancher | 29—155.53 |
| 2,768,317 | 10/1956 | Porter | 310—183 |
| 2,769,108 | 10/1956 | Risch | 310—265 |
| 2,884,549 | 4/1959 | Hallidy | 310—183 |
| 2,996,791 | 8/1961 | Hicks | 29—155.53 |

ORIS L. RADER, *Primary Examiner.*

MILTON O. HIRSHFIELD, *Examiner.*